United States Patent [19]

Farley

[11] Patent Number: 5,545,491

[45] Date of Patent: Aug. 13, 1996

[54] RELATING TO BATTERY PACK ARRANGEMENTS

[75] Inventor: Joseph Farley, Villeneuve-Loubet, France

[73] Assignee: Texas Instruments Incorporated, Dallas, Tex.

[21] Appl. No.: 251,868

[22] Filed: Jun. 1, 1994

[30] Foreign Application Priority Data

Jun. 2, 1993 [FR] France .................................. 93 06592

[51] Int. Cl.$^6$ .............................................. H01M 14/00
[52] U.S. Cl. .................................................. 429/7; 429/9
[58] Field of Search ............................ 429/9, 7, 61, 90, 429/123, 160, 161, 97

[56] References Cited

U.S. PATENT DOCUMENTS

| | | | |
|---|---|---|---|
| 4,680,527 | 7/1987 | Benenanti | 320/2 |
| 5,122,427 | 6/1992 | Flowers | 429/97 |
| 5,136,620 | 8/1992 | Eaves | 377/15 |
| 5,146,150 | 9/1992 | Gyenes | 320/17 |
| 5,204,608 | 4/1993 | Koenck | 320/2 |
| 5,229,704 | 7/1993 | Knepper | 320/2 |

FOREIGN PATENT DOCUMENTS

| | | | |
|---|---|---|---|
| 0524377A1 | 4/1992 | European Pat. Off. | H01M 10/48 |
| 0512340A1 | 11/1992 | European Pat. Off. | H02H 7/18 |
| 0539640A1 | 5/1993 | European Pat. Off. | H02J 7/10 |
| 2525397 | 3/1983 | France | H01M 6/50 |
| 3628600A1 | 8/1986 | Germany | H01M 10/48 |
| 2219151 | 11/1989 | United Kingdom | H02J 7/00 |
| WO92/11679 | 7/1992 | WIPO | H02J 7/00 |
| WO94/00888 | 1/1994 | WIPO | H01M 10/48 |

*Primary Examiner*—John Niebling
*Assistant Examiner*—Brendan Mee
*Attorney, Agent, or Firm*—David S. Guttman; William E. Hiller; Richard L. Donaldson

[57] ABSTRACT

Battery pack arrangement having a control module 305 in the form of a programmed microcontroller and associated components on a printed circuit board, one or more battery cells 21 in which the respective cells are interconnected by metal conductive straps 22, wherein one of the interconnecting straps has a portion 309 of reduced width so as to serve as a current sensing element in conjunction with the control module 305. The reduced width of the interconnecting conductive strap 22 provides increased electrical resistance to the current flowing therein, with the value of the current sensing element 309 being measurable and storable in memory. The microcontroller and a regulating component of the control module are arranged to be located in intercellular space between successive cells in the cell array 21. The battery pack arrangement further includes electronic circuitry operably associated with the processor 38 of the microcontroller 16 including an input terminal 45 for accommodating a charger such that three different charging regimes are possible. The three charging regimes are respectively determined by the status of switching transistors Q1 and Q2 and resistors R1 and R2 to provide a trickle charge path, a quick charge medium current path, and a full current fast charge path depending upon whether the switching transistors Q1 and Q2 are "off" or are conductive.

1 Claim, 5 Drawing Sheets

RELATING TO BATTERY PACK ARRANGEMENTS

FIELD OF INVENTION

The present invention relates to Battery Pack arrangements and more generally to packs for energy storage devices.

BACKGROUND OF INVENTION

Many types of battery pack are in common use, some of the most common being rechargeable power supplies for portable equipment such as, for example, camcorders, mobile phones and notebook computers. Typically, such a pack comprises a battery of cells, a casing to protect and contain the cells, means for interconnecting the cells within the casing and conductors running from the interconnected cells to external terminations. The casing shape and termination placement my be such that it mates both electrically and physically with external equipment such as that exemplified above and, in the case of a rechargeable pack, a charger. Also included within the pack is a thermally sensitive circuit breaker which serves to disconnect the cells in the event of excessive cell temperatures.

Presently, it is being proposed to include some control or monitoring means within a battery pack. Such an arrangement might provide for charge current control during recharge, charge monitoring during discharge and charge (for a rechargeable pack), display of battery condition and possibly transmission of battery condition or other parameters to external equipment. Such arrangements are described in European Patent Application 92402955.6. In one such arrangement, the control means can be implemented using a micro-computer of the micro-controller type. Arrangements of this type are sometimes referred to as "intelligent battery packs".

SUMMARY OF THE INVENTION

My invention provides a compact way of including a measuring resistor and measuring circuit within a battery pack having first and second pack terminals, a battery cell having first and second cell terminals respectively coupled by conductors to the first and second pack terminals, and a housing enclosing the battery cell and conductors. A measuring-resistor strap having first and second projecting measuring contacts forms at least a portion of the conductors. A separate current-measuring circuit is mounted in the housing so as to couple to the first and second projecting measuring contacts.

BRIEF DESCRIPTION OF DRAWINGS

In order that features and advantages of the present invention rosy be more fully appreciated, an embodiment will now be described, by way of example only and with reference to the accompanying diagrammatic drawings of which.

DETAILED DESCRIPTION

Figure 1:
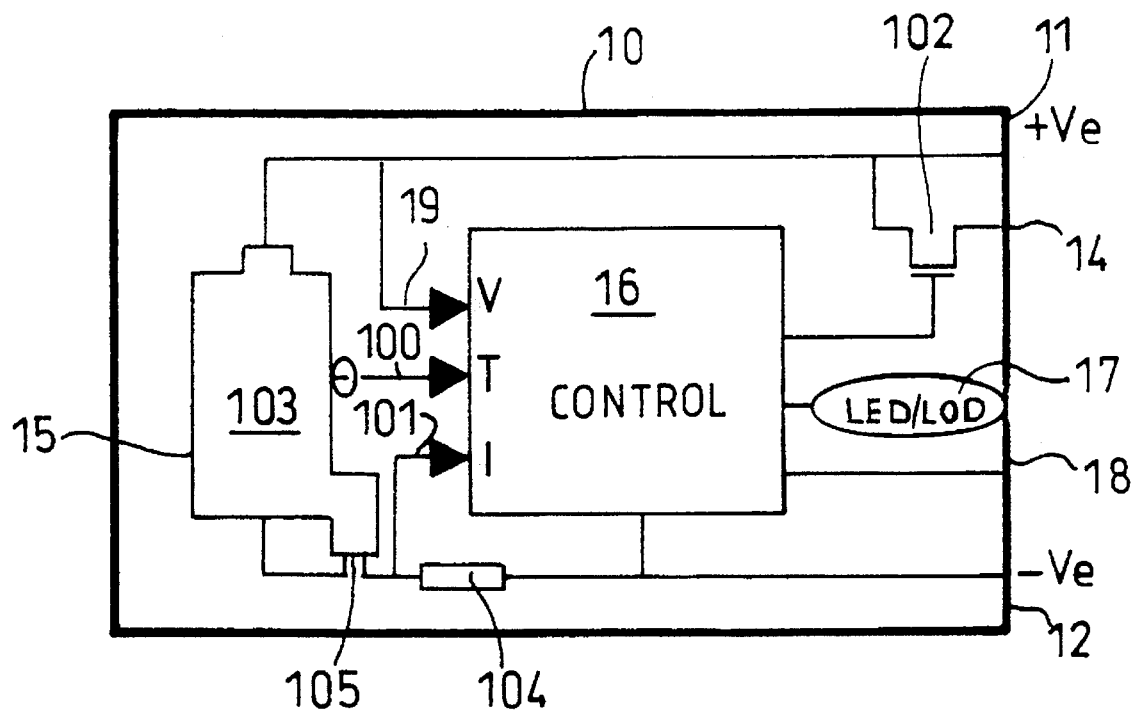
FIG. 1 represents an intelligent battery pack.

In a battery pack arrangement (shown schematically in FIG. 1) 10 external terminations 11 and 12 respectively are connected to the positive and negative outputs of a cell or cell array 15. A control module 16 receives signals representative of cell voltage 19, temperature 100 derived from a temperature sensor 103 in thermal contact with the cell 15 and cell current 101 derived by measuring voltage across a sensing resistor 104 with respect to the external negative voltage 12. A thermally sensitive circuit breaker 105 in thermal contact with the cells is arranged to disconnect the cell current in the event of excessive cell temperature. The control module 16 drives an externally viewable light emitting diode or liquid crystal display 17 and also controls a regulating device 102 to provide control of a charging current applied between charge terminal 14 and the negative external connection 12.

Figure 2:
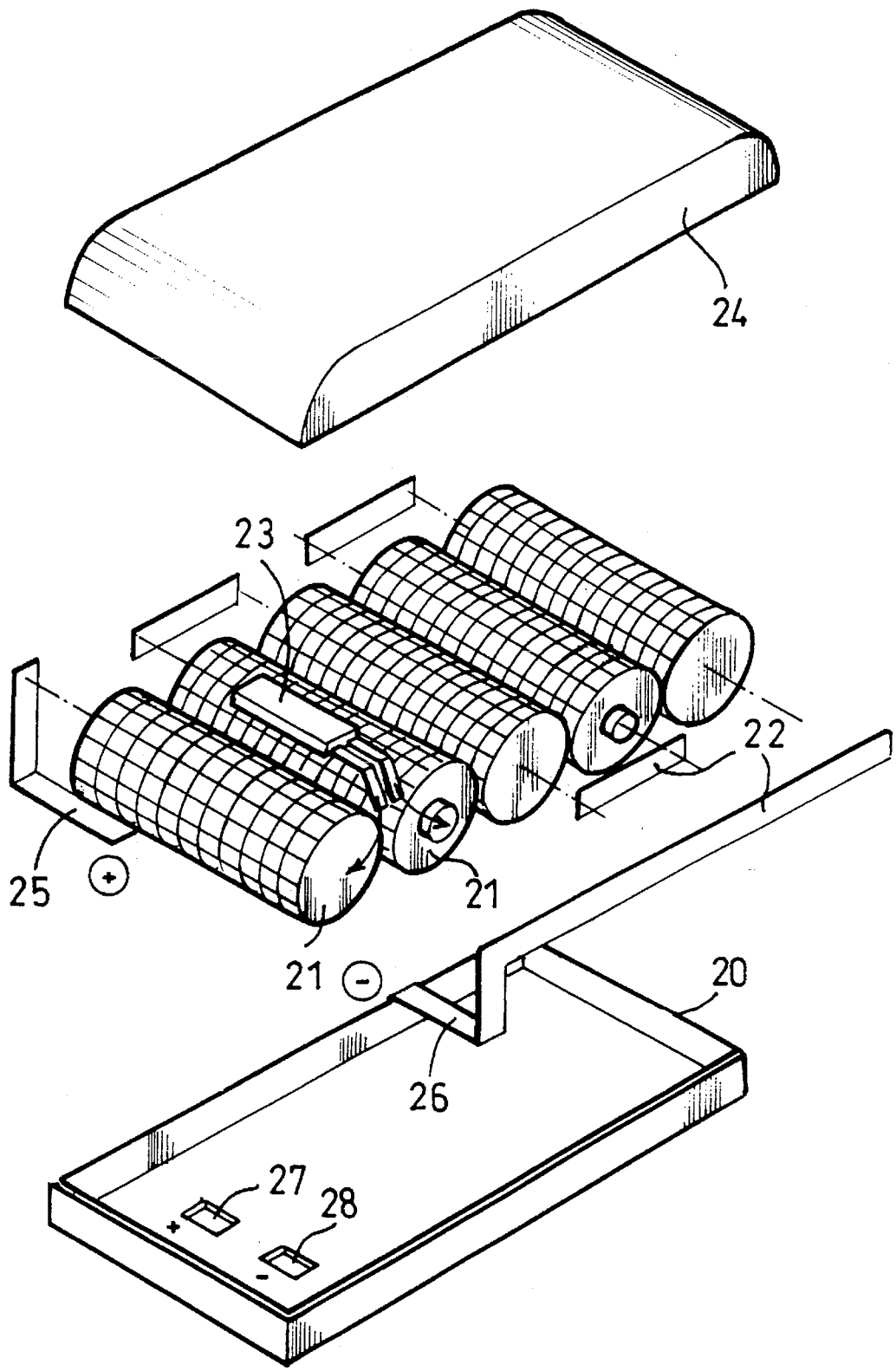
FIG. 2 a prior art battery pack arrangement.

The physical layout of a prior art battery pack is shown in FIG. 2 and comprises a container made up of a face plate 20 and a top cover 24 formed in a plastic material and mated together, for example, by ultrasonic bonding. Inside the container is a cell array 21 which is interconnected by means of a plurality of metal conductive straps 22. Part of the interconnection is provided by a thermally sensitive circuit breaker 23. External connections are provided by strap extensions 25 and 26 such that when the pack is assembled, are electrically accessible via openings 27 and 28 respectively in the phase plate 20 of the container.

Figure 3:
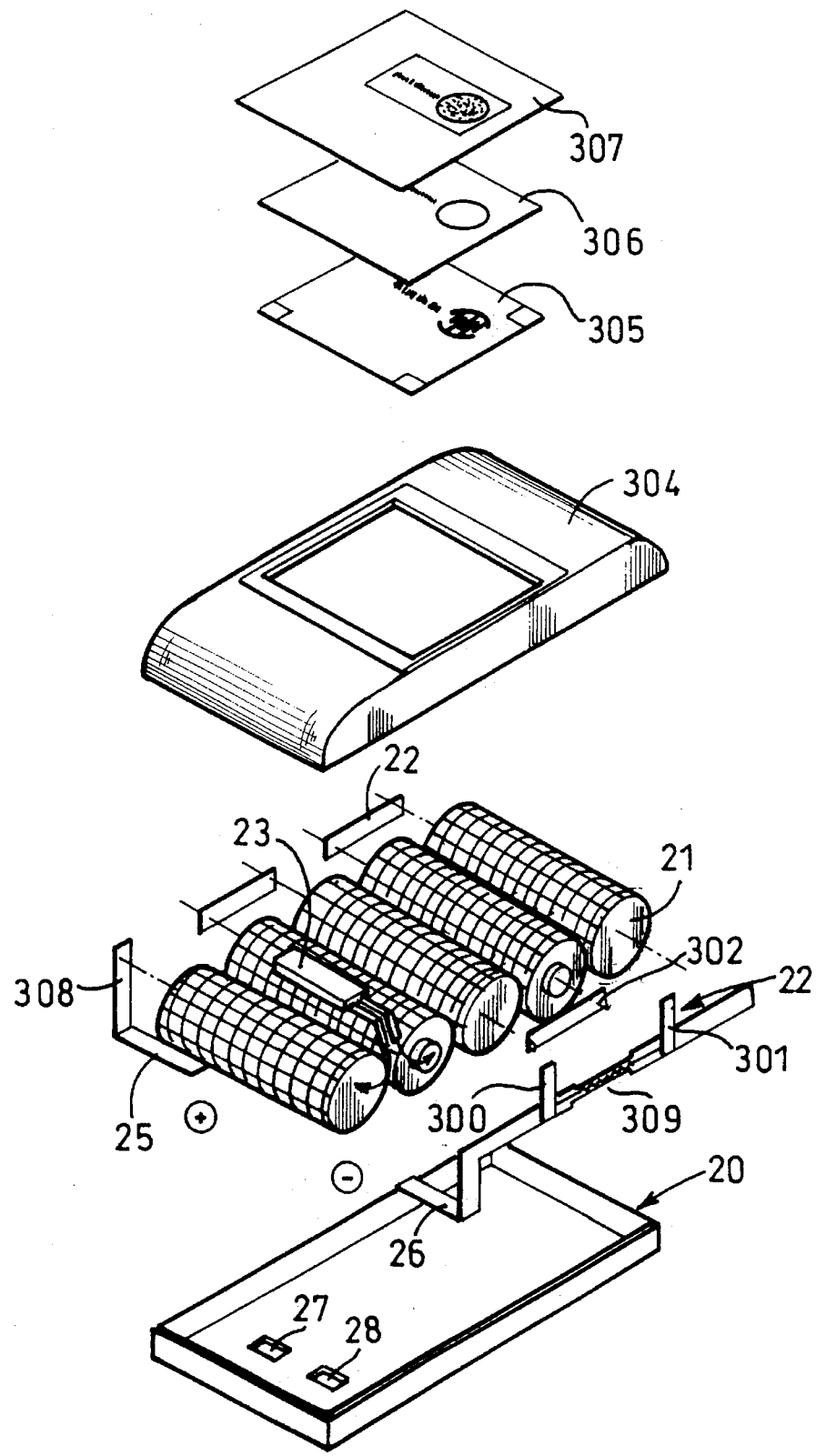
FIG. 3 a battery pack arrangement in accordance with the present invention.

In a battery pack in accordance with the present invention (FIG. 3) in which where parts are equivalent to those in the pack illustrated in FIG. 2, common reference numerals have been used) a control module 305 is provided in the form of a programmed microcontroller and associated components on a printed circuit board. The control module fits into an opening 30 in a top cover 304 of a container formed in conjunction with the face plate 20. The module is covered by an insulating and/or smoothing film or lamina 306 and is held in place by a cover plate 307 which co-operates with the top cover 304, for example, by adhesion to a shoulder surrounding opening 30 or an interference or snap fit into said opening. In some arrangements lamina 306 may be omitted. It will be observed that one of the interconnecting straps 22 has a portion 309 of reduced width forming a portion of increased electrical resistance to the current flowing therein. Either side of the resistive portion 309 are extension posts to the connecting strap 22, respectively 300 and 301 which together with similar extension post 308 are arranged to make electrical contact with predetermined regions on the control module 305 when it is assembled into the opening 30. It will be appreciated that thereby the control module is connected to the cell positive supply (308) to the cell negative supply (300) and across the resistive portion 309 (300, 301). Although a typical 'camcorder' type battery pack has been depicted, it will be appreciated that the present invention may be applied to other pack constructions.

Figure 4A:
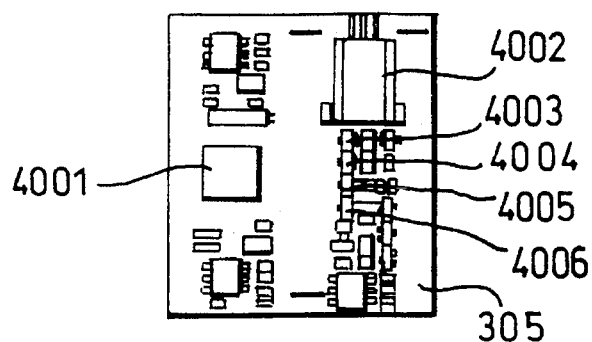
FIGS. 4(a) to 4(d) some detail of the arrangement of FIG. 3.
Figure 4B:
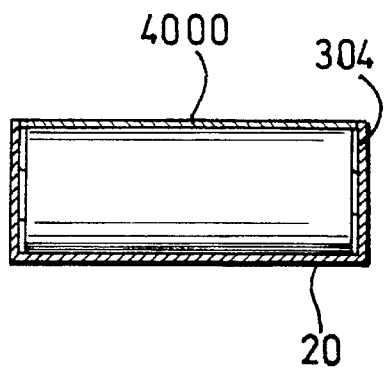

The control module 305 may be seen in more detail in FIG. 4a and to include a microcontroller 4001, a power switching or regulating device 4002, light emitting diodes for display purposes 4003, 4004, 4005 and 4006 and a number of other electrical components. The other side of the printed circuit board is shown in FIG. 4d in which an area of contact for an externally accessible switch 4007 will be observed together with the light emitting diodes 4003, 4004, 4005 and 4006 which are visible from this side of the board through openings formed therein. This control module would provide a fully featured pack. For simpler pack (charge monitor only, for example) some features (for example, the regulating device 4002) may be omitted or inactive.

Figure 4C:
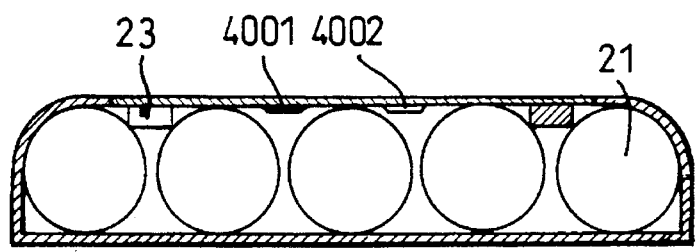
Figure 4D:
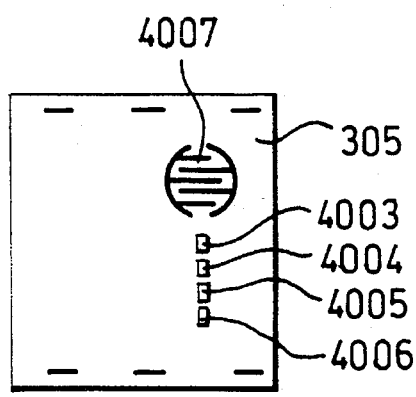
Figure 5:
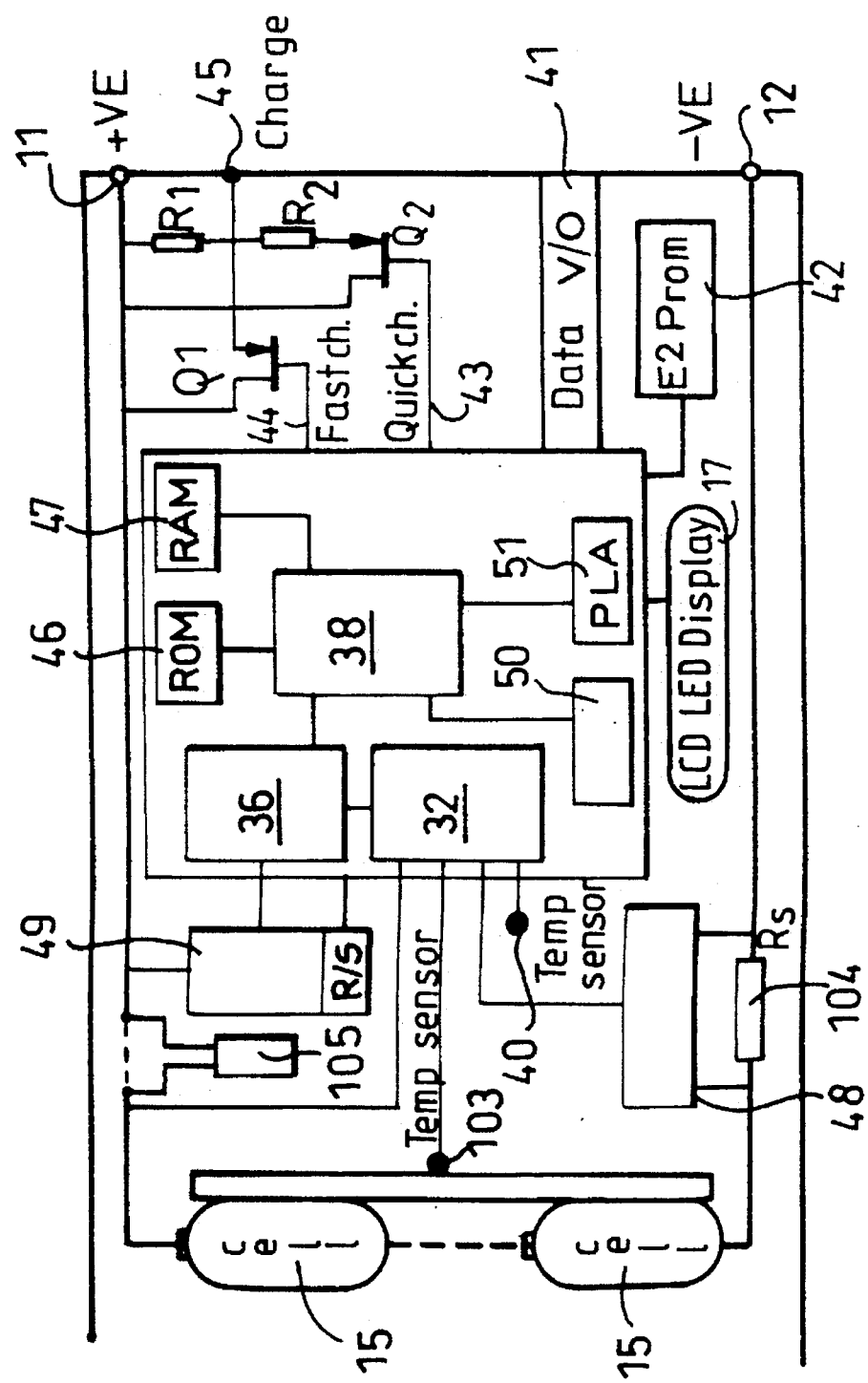
FIG. 5 a further example of an intelligent battery pack.

The arrangement of the control module with respect to the cells 21, the face plate 20 and the top cover 304 and the circuit breaker 23 may be seen more clearly in FIG. 4c. It will be observed, For example, that the microcontroller 4001 and the regulating component 4002 are arranged to be located in intercellular space such that there is no protrusion. Post extension 304 makes an electrical connection to the module 305 in a region 4000, as previously described.

The operation of the battery pack will now be considered in more detail. A sense resistor Rs is present in negative cell supply line 184. This sensor is used to provide a differential input to a signal conditioning circuit 48 and onward to a multiplexer 32. A temperature sensor 103 which is in thermal contact with a heat conductive member 34 contacting the cells also provides a signal to multiplexer 32. A yet further input to the multiplexer 32 is provided on an input line 35 connected to the overall positive voltage line of the cell array. One of the signals present at the inputs of the multiplexer 32 my be selected thereby for application to an analog to digital converter 36. The output of the A to D converter 36 is fed as data to a CPU 38 of a microprocessor arrangement including read only memory 46 and random access memory 47. The processor 38 controls a programmed logic array 51 which in turn activates a display 17. The processor also controls a power driver arrangement which can switch power transistors Q1, Q2. Associated with the processor 38 is a timer 50. In the drawing, operational signal component interconnections have been shown; signal connections such as data buses, address buses, control and timing signal connections have been omitted for clarity.

The present embodiment has an input 45 to which the charger my be connected in addition to positive/negative cell terminals respectively 14 and 15. The benefit of this arrangement is that three charging regimes my be made available by providing switching transistors Q1 and Q2. When both transistors are off, a trickle charge path is provided via resistor R1. When a control signal is provided by the processor on line 43 to switch Q2 into the conductive state, an additional quick charge medium current path is provided by Q2 and R2. When a signal is similarly generated on line 44, transistor Q1 switches on providing a full current fast charge path.

Components within boundary 50 are provided in the form of an integrated microcontroller device. Electrically erasable programmable read only memory 42 also forms part of the integrated controller and is available for the storage of parameters. Data tony be transmitted externally via an input/output bus 41, which my be available for connection on the printed circuit board 304, but not necessarily once the pack is fully assembled. For example, during calibration and final assembly. Switching transistors Q1 and Q2 my together be positioned as the regulating element 4002. Charge input 45 is optional as it will be noted that the arrangement can be charged by direct connection to the positive supply 11, and indeed in the battery pack of FIG. 3 no such connection is externally available.

It will be observed that the sensing resistor Rs is formed by virtue of the portion 309 of increased electrical resistance of strap 22 (FIG. 3); that is it is of unitary construction therewith. This will be contrasted with prior art arrangements having a discrete sense resistor mounted on a printed circuit board, for example. There are several advantages to the arrangement in accordance with the present invention. For example, there is no variation in contact resistance between conducting straps and a discrete sense resistor since these connections are eliminated. Reliability is improved since connection failure (unsoldering, for example) of the sense resistor is impossible.

Since the resistance of the sensor tony be spread over a region of the strap, there is no local 'hot spot' caused by heat generation in a discrete sense resistor. Furthermore, the thermal mass of the cells themselves act as a heat sink.

A very stable contact resistance is achieved .since the strap may be spot welded onto the cell assembly with no soldered connections in the path. This is also a very reliable arrangement. Moreover, efficiency is improved as a portion of the swap resistance (heating in which is an energy loss which cannot be avoided) contributes to the sense resistance. Hence, the sense resistance is not entirely an addition to the inevitable strap resistance.

In construction, the sense resister portion my be formed by removal of pheripheral material of an initially strip like strap. In the embodiment, there is no need for a precise value to be achieved since by passing a known charging current for example, an '1C' current (C being the current which is specified fully to discharge the pack in 1 hour) through the strap, the microcontroller can calculate the precise value of the resistor for the particular pack and stere it, for example in EEPROM. Importantly, this calibration may be performed slier pack assembly.

Since the sense resistor is effectively welded to the cell assembly, there is a good thermal conductive path to the cells. A mica insulator 302 may be used further to promote heat conduction and allow the resistive strap to be mounted very dose to the cells. As well as providing a heat sink, this contributes to pack safety since heating in the resistor contributes directly to cell heating, and thereby to the eventual operation of safety circuit breaker 23. Faster operation is therefore achievable under very high and damaging current conditions. In arrangements having a charge control component (4002), the construction is such that this is also proximate the cell assembly and thermal cut-out, so the same argument may be applied. In view of the proximate, a cell thermal sensor may be mounted on the PCB itself which is highly convenient. It will be observed that the arrangement of the components for the control module is such that they may fit in the intercellular space. The printed circuit board itself fits on a ledge of the plastic case. This is an important feature of the arrangement, since it gives the intelligent pack a zero volume increase with respect to prior art packs with no intelligence. Hence, all existing mounting and configuration requirements can be met. The battery pack energy per circuit volume is preserved even when intelligence is provided.

In manufacture, the upper and lower case portions (304, 20) may be mated before the control module is introduced. This is another important feature of the arrangement since no case assembly stress is applied to the printed circuit board. This is particularly advantageous if the mating process is a high energy process such as ultrasonic bonding. Use of pressure contract only between the printed circuit board and strap extensions provide for low cost pack assembly and since only very low measurement currents flow, a high accuracy Kelvin arrangement is preserved. A current monitor only pack, for example, may be assembled entirely in this way.

Calibration etc can be performed after assembly. Importantly, battery pack characteristic can be programmed after case assembly, leading to the possibility of building but a single type, which is later characterised (i.e. its capacity specified) by control module programmation by direct contact with the PCB at a later date. All that would then remain is installation of the covers (306, 307). Hence, a single cell and control module type can serve all different required pack capacities.

I claim:

1. In a battery pack having first and second pack terminals, a battery cell having first and second cell terminals respectively coupled by conductors to the first and second pack terminals, and a housing enclosing the battery cell and conductors, the improvement comprising:

a measuring-resistor strap having first and second projecting measuring contacts (300, 301), forming at least a portion of the conductors; and a separate current-measuring circuit mounted in the housing so as to couple to the first and second projecting measuring contacts.

* * * * *